United States Patent [19]

McPheely et al.

[11] Patent Number: 5,844,601
[45] Date of Patent: Dec. 1, 1998

[54] VIDEO RESPONSE SYSTEM AND METHOD

[75] Inventors: Bernard M. McPheely, Greer, S.C.; Alan D. Collins; John G. O'Donnell, both of Flower Mound, Tex.

[73] Assignee: Hartness Technologies, LLC, Greenville, S.C.

[21] Appl. No.: 622,476

[22] Filed: Mar. 25, 1996

[51] Int. Cl.⁶ .............................. H04N 7/18; H04N 9/47
[52] U.S. Cl. .......................... 348/143; 348/150; 348/159
[58] Field of Search ................... 348/143, 151, 348/153, 158, 211, 212, 213, 214, 14, 15; 455/33.1, 33.2, 54.1, 56.1; H04N 7/18, 9/47

[56] References Cited

U.S. PATENT DOCUMENTS

| | | | |
|---|---|---|---|
| 3,155,907 | 11/1964 | Shepherd | 455/33.2 |
| 4,097,893 | 6/1978 | Camras | 348/158 |
| 4,605,959 | 8/1986 | Colbaugh | 455/606 |
| 4,656,509 | 4/1987 | Matsuyama et al. | 358/100 |
| 4,789,947 | 12/1988 | Macejczak | 364/512 |
| 5,128,755 | 7/1992 | Fancher | 358/108 |
| 5,241,380 | 8/1993 | Benson et al. | 348/143 |
| 5,259,613 | 11/1993 | Marnell, II | 273/138 |
| 5,309,351 | 5/1994 | McCain et al. | 364/132 |
| 5,331,413 | 7/1994 | Diner | 348/143 |
| 5,350,033 | 9/1994 | Kraft | 180/167 |
| 5,382,943 | 1/1995 | Tanaka | 340/539 |
| 5,384,588 | 1/1995 | Martin et al. | 348/15 |
| 5,406,324 | 4/1995 | Roth | 348/143 |
| 5,408,330 | 4/1995 | Squicciarini et al. | 358/355 |
| 5,438,362 | 8/1995 | Tabuchi | 348/211 |
| 5,517,236 | 5/1996 | Sergeant et al. | 348/143 |
| 5,526,041 | 6/1996 | Glatt | 348/143 |
| 5,619,183 | 4/1997 | Ziegra et al. | 348/143 |

*Primary Examiner*—Tommy P. Chin
*Assistant Examiner*—Nhon T. Diep
*Attorney, Agent, or Firm*—Robert R. Reed; Cort Flint

[57] ABSTRACT

A system and method is disclosed for instructing personnel in the operation and servicing of machinery at a plant from a geographically remote service center employing trained personnel. The system and method includes monitoring operating machinery at the plant with a video camera and transmitting a video signal to a base unit associated with the plant having a high resolution monitor. Audio communication is also provided between plant personnel and the personnel at the service center wherein audio signals are received and transmitted through the base unit. The video and audio signals are processed together at the base unit for synchronous transmission over a telecommunication system to the remote service center. The machinery is monitored in the plant with a cordless portable video camera by moving the portable video camera to a desired area of the operating machinery which needs monitoring. Cordless headsets, worn by plant personnel attending the machinery, are utilized to provide audio communication through the base unit at the plant. The plant may be divided into a plurality of machinery zones having zone interface units hard wired to the base units. The video signal is transmitted using radio frequency (RF) transmissions to the zone interface unit, and then to the plant base unit. Switches may be used between the zone interface units and the base unit to provide reception of a strong video signal at the base units.

37 Claims, 7 Drawing Sheets

VIDEO RESPONSE SYSTEM AND METHOD

BACKGROUND OF THE INVENTION

This invention relates to a system and method for servicing machinery in operation and/or training operational personnel in an industrial plant by service personnel and technicians at a geographically remote service center.

Previously, it has been known to monitor the production of machinery and processes, and communicate production and other data to a remote facility. For example, U.S. Pat. No. 5,309,351 discloses a system for transmitting maintenance and diagnostic information over a communication satellite between a computer or hand held unit, and factory machinery.

It is also known to use video cameras to observe events from a remote location. For example, U.S. Pat. No. 5,382,943 discloses a security system which uses a video camera for monitoring the security of a remote building site from a central control center via radio transmission. U.S. Pat. No. 5,384,588, discloses wire and wireless transmission of video signals, such as in a video conferencing system, wherein the video signal may be split up into different components for viewing different sites. U.S. Pat. No. 4,789,947 discloses a video camera mounted on a guide rack for monitoring the condition of a bridge from a remote location. U.S. Pat. Nos. 4,656,509 and 5,241,380 disclose track mounted video cameras for monitoring a condition from a remote location. U.S. Pat. No. 5,350,033 discloses a robotics inspection vehicle and video camera operated by a joystick at a remote location using radio transceiver devices.

However, none of the above systems and methods are suitable for servicing machinery in operation at an industrial plant from a remote service center, particularly where the machinery is dispersed at several locations in the plant, and allow audio and video communication between plant and service personnel.

Accordingly, an object of the present invention is to provide a system and method for the servicing of machinery operating in a plant from a geographically remote service center;

Another object of the present invention is to provide a system and method for the remote servicing of machinery operating and/or training at a plant facility whereby the operation of the machinery may be viewed at a geographically remote service center at which trained technicians may communicate with plant personnel to service the machinery and train personnel without the need of costly travel;

A further object of the present invention is to provide a means to train machinery operators from a remote location so that a number of operators at different locations can receive the best real-time training available;

Another object of the present invention is to provide a remote servicing system by which operating machinery at a plant may be serviced at a remote service center by trained service personnel wherein video monitoring may be controlled remotely by the service personnel to allow video focusing on a desired area of the operating machinery for servicing;

Another object of the present invention is to provide a system and method for the remote servicing of machinery operating in a plant by experienced service personnel at a geographically remote location wherein machinery operating at various dispersed locations within a plant facility, or multiple plants, may be viewed using the system and method;

Another object of the present invention is to provide a system and method for the servicing of machinery operating in a plant by trained service personnel at a geographically remote location wherein both video and audio monitoring of the machinery may be provided at different machinery locations between service and plant personnel to eliminate the need of costly travel for the servicing of the machinery.

SUMMARY OF THE INVENTION

The above objectives are accomplished according to the present invention by providing a video response system for communicating the operation and servicing of machinery between a plant where the machinery is located and a remote service center wherein a wireless, portable video camera is provided having a video signal depicting the operation of the machinery in the plant. The system further comprises an audio unit for the wireless transmission and reception of audio signals by attending plant personnel; and a first base unit located in the plant for receiving the video and audio signals. The base unit comprises an audio transceiver for receiving audio signals from the plant personnel and for transmitting audio signals to plant personnel, and a signal processor for receiving the video and audio signals to convert the signals into modulated digital signals for transmission to remote service center. An output interface provides the digital signals in a form to be delivered over a telecommunication system to the service center.

Preferably, a receiving antenna and a transmitting antenna are wired to the audio transceiver at the base unit for receiving and transmitting radio frequency (RF) audio signals. The audio unit includes at least one wireless audio headset to be worn by plant personnel for communicating with transmitting and receiving antennas. The output interface may include an inverse multiplexor for strapping together multiple lines of an integrated services digital network to transmit digital signals to a second base unit at the service center at a high data rate for generating a high resolution video display at the service center.

The base unit may also include a base unit camera for viewing personnel at the location of the base units and generating a base video signal, and a monitor for displaying the camera video signals or base video signals.

A second base unit is provided at the remote service center having a video monitor for displaying video signals from the first base unit; and an audio transceiver for receiving audio signals from the first base unit, and producing an audible message at the service center. The second base unit includes a signal processor for receiving video signals from the first base unit, and processing the video signal for display on a monitor.

At least one zone interface unit is located within an area of the operating machinery for receiving video signals from the wireless, portable video camera and transmits the video signal to the first base unit. A radio frequency (RF) transmitter is associated with the portable camera for transmitting video signals to the zone interface unit. Preferably, a plurality of zone interface units is associated with different zones of operating machinery, and a switch is provided for selecting a particular zone interface unit to provide a video signal of high quality with regard to the location of the portable video unit.

In an alternate arrangement, the base unit maybe portable and may be moved to one of the zones as desired. A base unit cable is provided for plugging the base unit into a zone interface unit. The zone interface unit is wired to the telecommunication system for transmitting video and audio signals to the service center. A circuit splitter is wired between the zone interface units and the telecommunication system for automatically transmitting signals from the zone interface unit into which the base unit is plugged.

In accordance with other aspects of the invention, a method is disclosed which includes servicing machinery at a plant from a geographically remote service center which employs trained service personnel for monitoring operating machinery at the plant by use of a video camera having a video signal. The method includes transmitting video signals to a base unit associated with the plant; processing the video signal at the base unit for transmission over a telecommunication system; transmitting the video signal from the base unit to the remote service center over the telecommunication system; and displaying the video signal on a monitor at the remote service center. Audio communication is provided between plant personnel at the plant and the service personnel at the remote service center; and the method includes providing service assistance by the service personnel to the plant personnel for operating the machinery while viewing the monitor and listening to audio communication. Preferably, the method includes monitoring the operating machinery in the plant with a wireless, portable video camera which provides a first video signal. The method includes moving the portable video camera to a desired area of the operating machinery which needs servicing. The portable video camera maybe mounted on a transportable carrier, and is moved and focused on the operating machinery for servicing by using a remote controller. In an alternate arrangement, the focusing of the video camera maybe controlled by using a remote controller at the geographically remote service center so that service personnel may direct the focusing upon an area of the operating machine for servicing. In this case, a video camera maybe affixed to a stationary mount in an area of the operating machinery and controlled with respect to pan, tilt, and focus using remote control.

The method contemplates dividing the plant into a plurality of machinery zones, having respective zone interface units, and transmitting the video signal from the video camera to a selected zone interface unit, and from the zone interface unit to the base unit so that a video signal of high strength which provides high resolution is received from the zone unit. Switching between the zone units may be done in accordance with the strength of the video signal to provide reception of the video signal of high strength at the base unit. Use of an automatic switch may be had which automatically senses the strongest signal at one of the plugs having a zone unit and transmits the video signal of maximum strength from zone unit to base unit. The method includes transmitting the video signal from the portable video camera to the zone units using radio frequency (RF) transmission. The method contemplates the use of a zoom unit at the plant having a zoom video camera for zooming in on details of machine parts and components for providing a zoom video signal of details for transmission to the remote service center. Processing of the audio and video signals is done by converting and compressing the signals to provide modulated digital signals for transmission to the remote service center. The method also includes separating the signals into a plurality of bandwidths of digital signals, and strapping the bandwidths together for transmission to the remote service system.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now to the drawings, the invention will now be described in more detail. As can best been seen in FIGS. 1 and 2, an embodiment of a video service system, designated generally as A, is illustrated for servicing machinery, or training machinery operators, from a geographically remote location in accordance with the invention. Video service system A includes a base unit B located within a plant 10 in which the machine is to be serviced. There is a portable video unit C located at the machinery for monitoring the operating machinery having a wireless, video camera 11 with a video output which provides a first video signal V1 of the operating machinery which is transmitted to base unit B. The video signal is processed by the base unit, and transmitted over telephone lines 92 as video signal V2 to a remote service center D. Various other video signals V2–V6, to be described more fully hereafter, audio signals A1, and control signals S are processed and transmitted over an integrated services digital network (ISDN) 21 between plant 10 and remote service center D. At remote service center D, trained service personnel and technicians may study a video display of the operating machinery and communicate orally with plant personnel attending the machinery to provide servicing and/or training.

Figure 2:
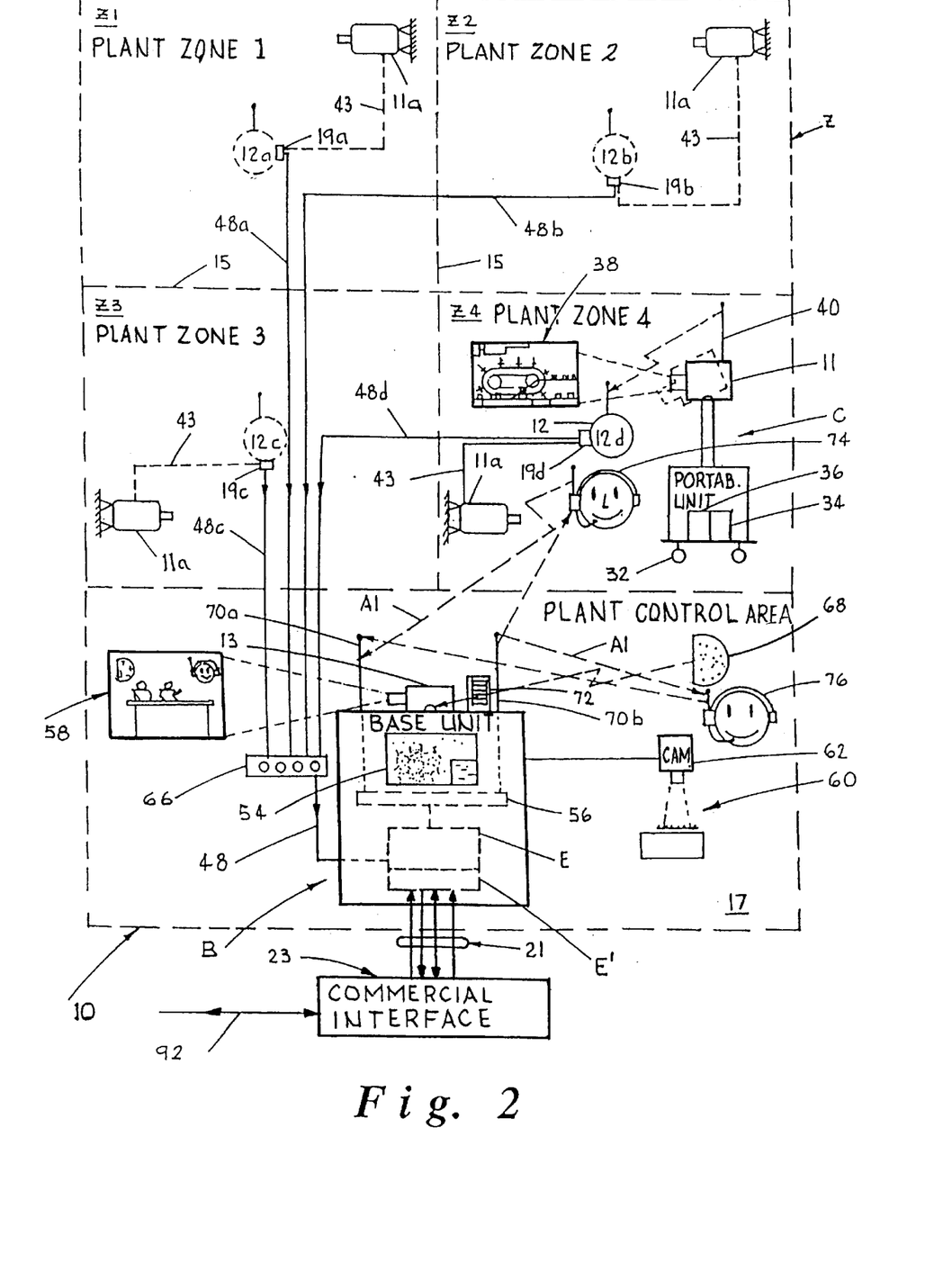
FIG. 2 is a detailed schematic and block diagram of a system and method for servicing in-plant machinery by trained service personnel at a geographically remote service center according to the invention wherein machinery maybe located at different zones in a plant facility.
Figure 5:
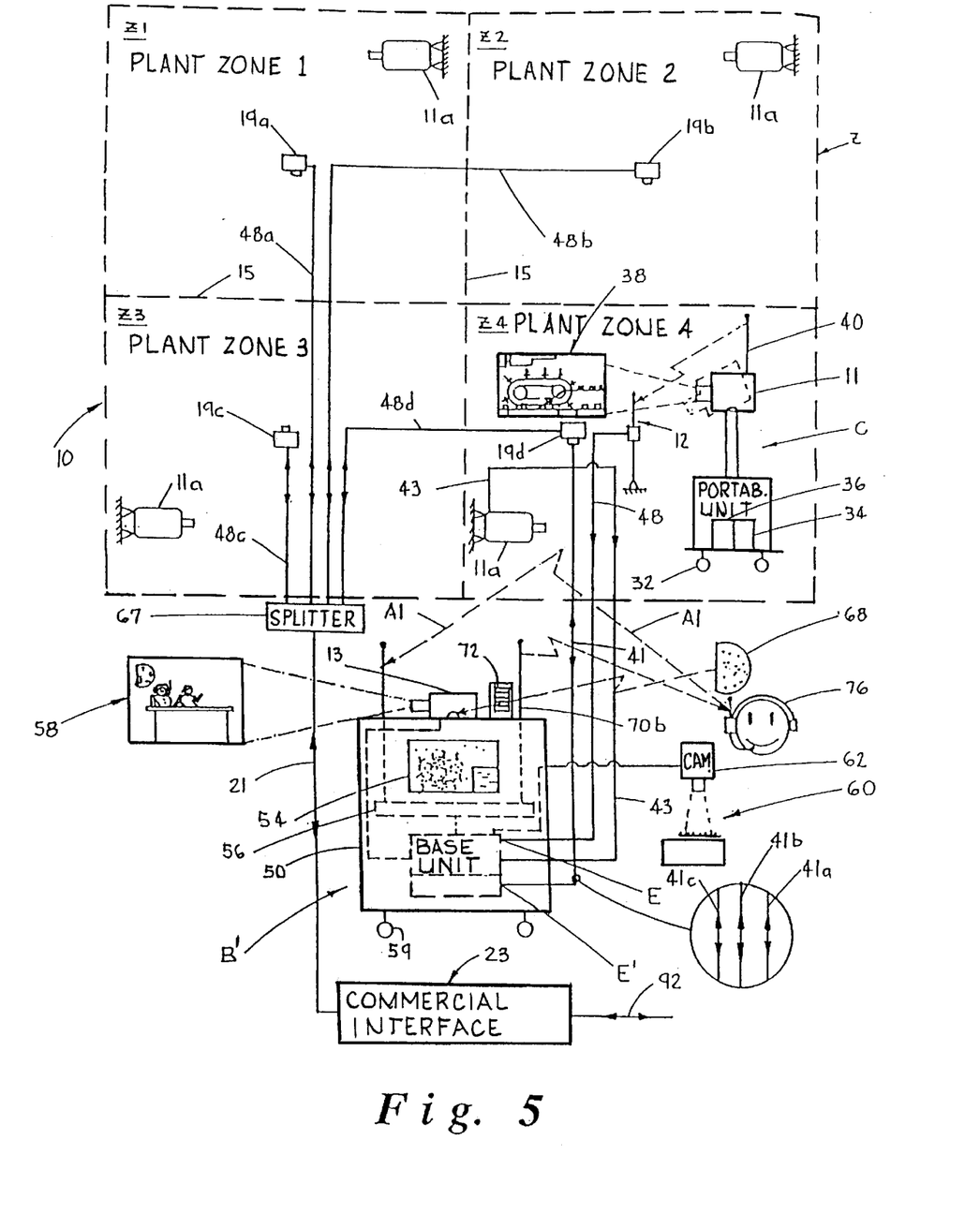
FIG. 5 is a schematic diagram of an alternate embodiment of the system where a base unit may be employed at one of a plurality of plant zones, and automatically selected for transmitting video signals of the machinery at that zone.

As can best be seen in FIG. 2, base unit B and portable unit C are located in plant 10, which may be a typical manufacturing plant facility having machinery and/or processes that must be serviced on a routine basis. Portable unit C may be located in any one of a plurality of zones "Z" within the plant. Portable unit C transmits first video signal V1 from the plant, preferably using an antenna of a zone unit, designated generally as 12, to base unit B. Base unit B may be located at a central location in a plant control area 16 (FIG. 2), or may be moveable and located at the machinery (FIG. 5). As illustrated in FIG. 2, zone units 12 include zone plugs 19a–19d at zone interface units 12a–12d located in zones Z1–Z4 respectively, to provide transmission of a high quality video signal over wiring to the base unit as portable video unit C is moved within the plant. The zone interface units include radio frequency (RF) receivers hard wired through zone plugs 19a–19d and cables 48a–48d back to base unit B through a zone control switch 66. The zone control switch connects the video signal for viewing on a high resolution, studio grade monitor 54 having 450 horizontal lines, as is available from the Sony Corporation. Switch 66 may be manual, or may be an automatic switch of the cellular type which automatically picks up and transmits the strongest signal from the zones. Zone lines 15 may divide the plant into individual zones Z to provide the best video signal transmission quality to the base unit from a particular area of the plant. Physical barriers and electrical interference signals may determine the shape and size of the individual zones "Z" within plant 10.

One or more stationary video cameras 11a may also be utilized in addition to portable camera 11 to provide video coverage for the machinery or process in each zone. The stationary video cameras may be affixed to ceilings, walls, or stands as needed to adequately cover the operating machinery (FIGS. 2 and 5). Stationary cameras 11a may also be hard wired to base unit B using a cable 43 connected to zone plugs 19a–19d (e.g. 19d illustrated) for transmission of video signals. In this case, standard switching may be employed to select wireless camera 11 or stationary camera 11a.

Figure 3:
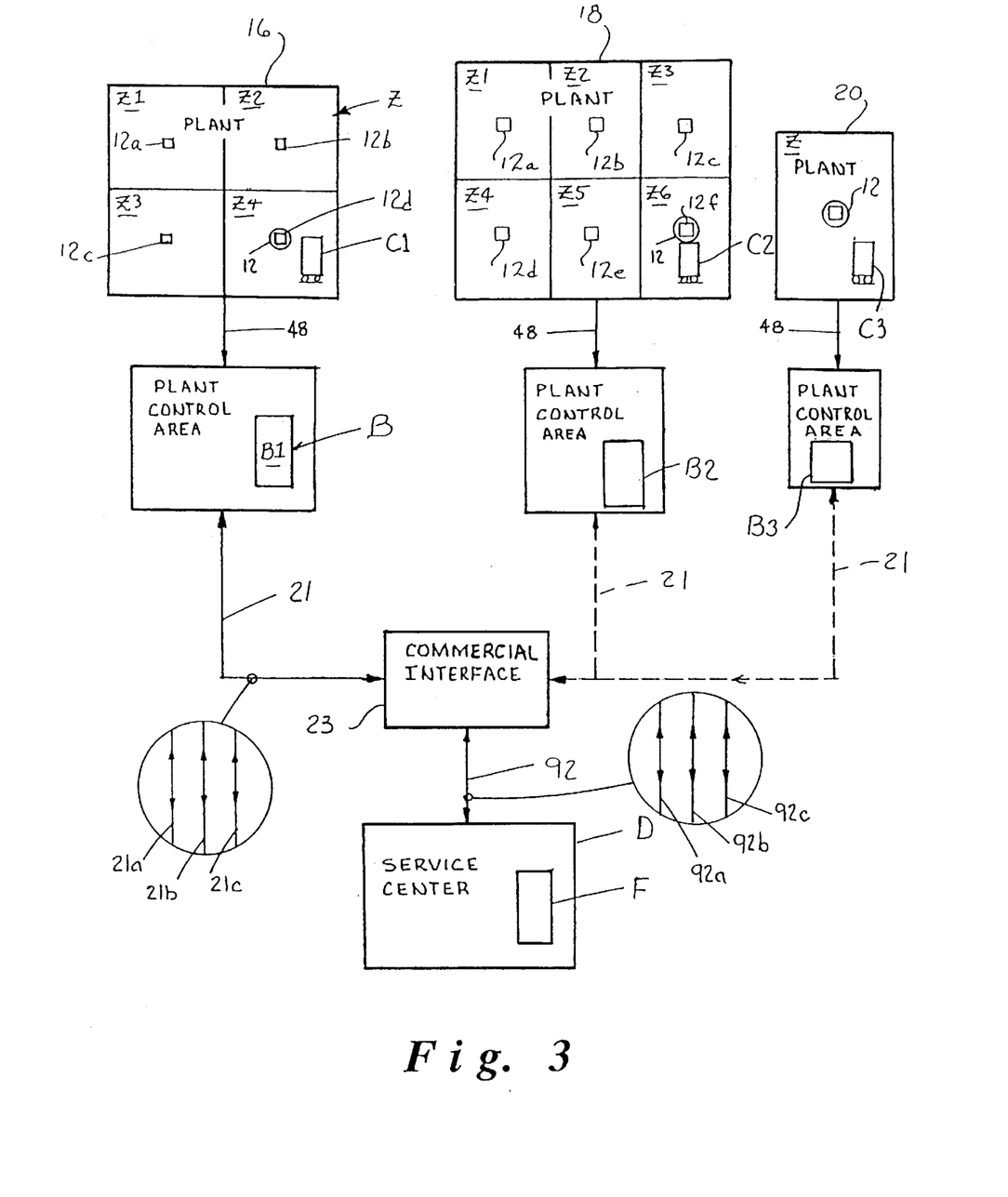
FIG. 3 is a detailed schematic and block diagram of a system and method for the servicing of in-plant machinery from a geographically remote service center where the machinery maybe located at different plant locations and/or zones according to the invention.

In accordance with another aspect of the invention, as can best be seen in FIG. 3, multiple plant locations each having a plurality of zones may be serviced according to the invention. For example, there may be three plants 16, 18, and 20. Each plant may have any number of zones, or only a single zone, as illustrated at plant 20. Each plant preferably has at least one portable unit C to generate a video signal of the plant's machinery which is transmitted by a RF signal to a zone unit 12. Zone units 12a–12f are hard wired to a base unit B at each plant. For example portable units and base units C1 and B1, C2 and B2, and C3 and B3 may be employed at plants 16, 18, and 20, respectively.

As can best be seen in FIG. 2, portable unit C includes wheels 32 for manual transportation of portable unit C to various zones where the operating machinery is located in plant 10. The portable unit may include a battery pack 34 which can be periodically charged using a battery charger unit 36 to make the portable unit independent of a power supply from the plant, and more portable. Portable video camera 11 is included in the portable unit to provide video signals of operating machinery 38 to be observed and/or serviced. The camera 11 is wireless, and can be a standard pan-tilt-zoom (PTZ) camera available in the industry, such as a model CCD-TR23 available from Sony Corporation of Dallas, Tex. The portable unit has a video antenna 40 and a RF unit for transmitting first video signal V1 to a zone unit and antenna 12. The video antenna and RF unit is available in the industry, such as model BE420T available from Premier Wireless, Inc. of California. Portable video camera 11 can be equipped with a battery and an RF unit so it can be detached from the portable unit, hand held and carried by an operator 74 to focus on any specified area of the machine. Optional stationary camera 11a can be used in lieu of, or in addition to camera 11.

Portable video camera 11, or optional stationary video camera 11a, can be positioned and operated by an operator to tilt-pan-zoom on a portion of the machinery necessary for servicing and/or training. In this embodiment of the invention, camera focusing can be directed by trained service personnel 78 at the remote service center D who know exactly what area of the machine to focus on for servicing, training or repairing. Instructions are transmitted by the audio signals A1 or A1' to the operator 74 located at the machine by way of base unit F to base unit B and on to the operator. The portable unit operator can be instructed to better focus on the plant machinery or process from both the plant control area 16 and/or by instructions from service personnel at the remote service center D.

In an advantageous aspect of the invention, standard zoom units 60 (FIG. 2) and 86 (FIG. 4) are provided in the plant and service center, and include zoom cameras 62 and 94 for detailed viewing of a subject such as a machine part. For example, the zoom camera 62 can provide a zoom video signal of a zoom subject 64 for transmission as another video signal V4 (FIG. 1) for possible viewing on the monitor 80 at the remote service center. The zoom subject can be a component part from plant machinery 38, a process control chart, a circuit board or any similar servicing aid or prop, and the like. Base video camera 13 and zoom camera 62 are directly connected to system device E of the base unit. Remote IR control pad 68 can control both the base unit camera 13 and the zoom camera 62.

Referring now to signal processing, base unit B generates a second video signal V2 to be transmitted by a telecommunications system line wherein the system may include a plurality of ISDN lines 21a, 21b, 21c (FIG. 1) in the preferred embodiment. A communication interface 23 receives digital video signal V2, as well as audio signals A1over ISDN line 21, and transmits them to a remote service center D over ISDN line 92. Communication interface 23 may be standard land based lines and/or a satellite system, and the like. It is to understood herein, that the term video signal is used to refer to the singular and a plurality of signals, and line is used to refer to the singular and a multiple of lines.

Figure 7:
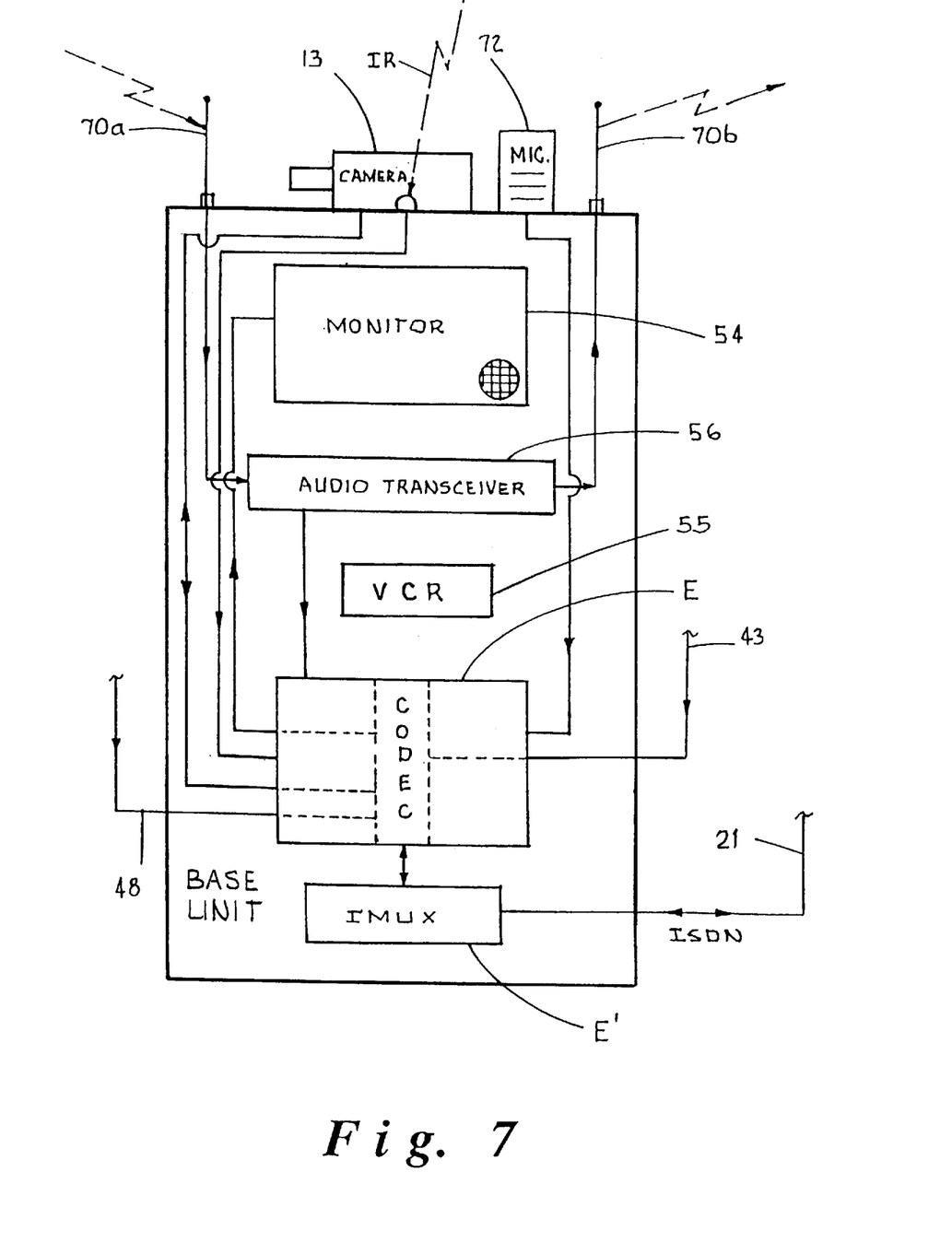
FIG. 7 is a schematic diagram of a base unit according to the invention for use in the system and method of the invention.

In an advantageous aspect of the invention, as can best be seen in FIG. 7, base unit B includes an audio transceiver component 56 having a receiving antenna 70a and a transmitting antenna 70b. The audio component is connected to and controlled by the system device E. Audio signals also come directly from a microphone 72 at the base unit to signal processing device E. The video/audio signals are received by base unit B, and processed by signal processor device E, and transmitted as second video signals V2 over ISDN lines 21 to communication interface 23 and service center D. The video/audio signals are compressed and transmitted over the communication lines at a high rate to generate high quality transmissions between the base unit B and the service center D. Signal processor device E may include a suitable "CODEC" component which digitizes, compresses and codes/decodes the video and audio signals (FIG. 7).

Figure 4:
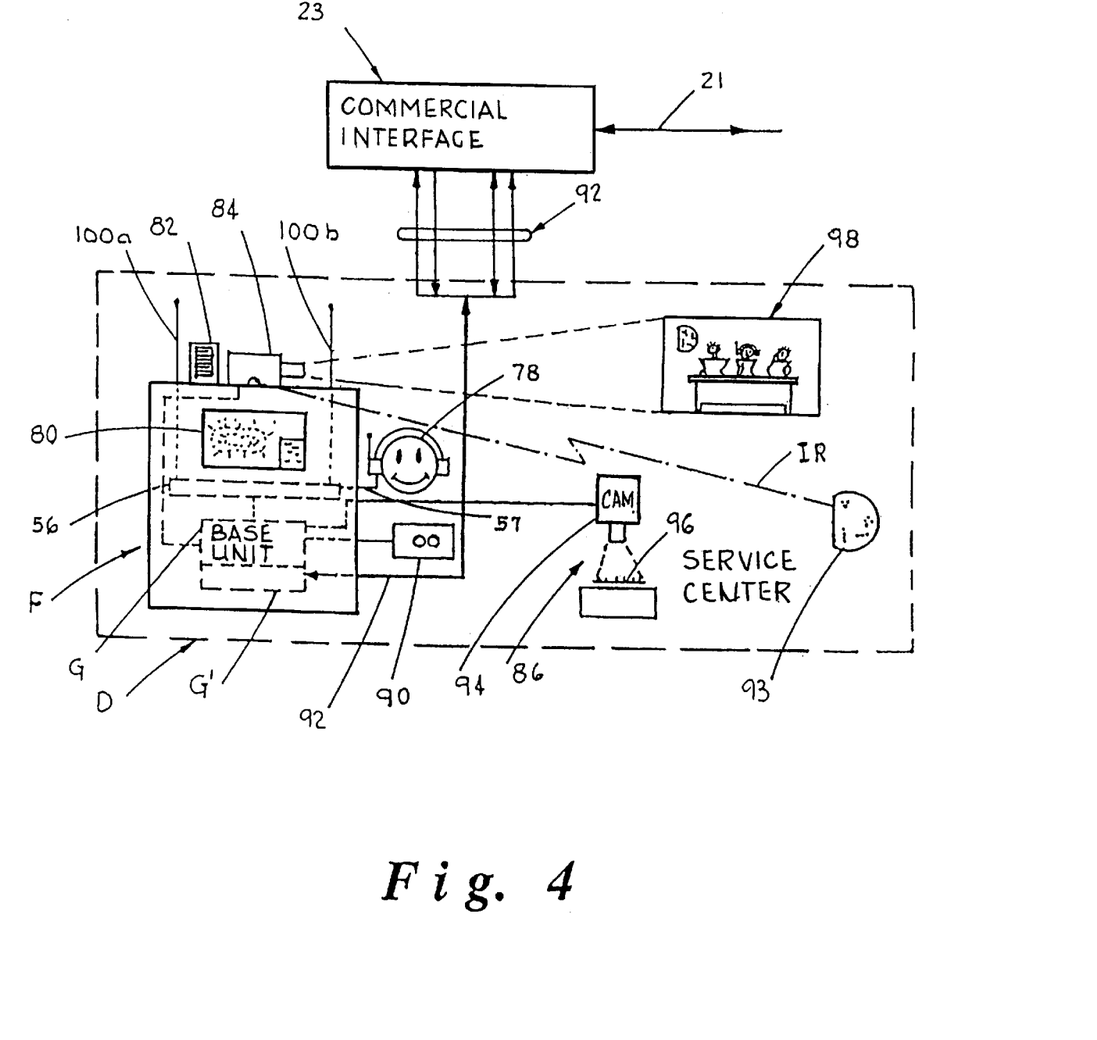
FIG. 4 is a schematic diagram of a remote service center from which machinery operating at a geographically remote plant facility may be serviced according to the system and method of the present invention.

The CODEC component may also receive video signals V1 from the portable unit by way of cable 48. Base unit camera 13 provides another set of video signals V3 to the CODEC component of device E. The CODEC is a modulator/demodulator (modem) that converts the pictures and sound to compressed digital signals for transmission to a receiving unit. A suitable CODEC device is Model VM 4500 manufactured by PictureTel Corporation of Danvers, Mass. Preferably, the base unit also includes an inverse multiplexor (IMUX) device E', connected to the CODEC. The CODEC converts pictures and sound to digital signals for the IMUX to transmit at a high data rate to the communications interface 23 and further to another base unit F at remote service center D. Real-time video pictures may be observed at a remote location of up to 30 frames per second with 450 lines of resolution on high resolution monitor 54. The IMUX divides the audio/video signals at their origin and recombine the audio/video signals at the remote location. The inverse multiplexor is included in both base units B, F (FIG. 3), and B' (FIG. 5). The IMUX "straps" the bandwidth of three ISDN lines together to get a data transfer rate of 384 Kilobits per second (Kbps). A suitable IMUX device is model no. MBB BRI 4U manufactured by Ascend of Almeda, Calif. The ISDN lines 21 may be a basic rate interface (BRI) type having two "B" channels each of which has a data rate of 64 Kilobits per second. Therefore, each ISDN line 21a, 21b and 21c has bandwidth of 128 Kbps. To transmit a high quality video picture for machinery servicing and/or training according to the invention, the three ISDN lines 21a, 21b, and 21c are used to provide excellent video pictures. The ISDN lines combine to give the desired data rate of 384 Kilobits per second for video/audio signals. The video/audio signals are received by another IMUX device G' at service center D which recombines the signals (FIG. 4). A video picture is viewed on the high resolution monitor at the remote service center for a high resolution real-time picture.

Base units B, F, and B' (FIG. 5) may include standard operational computer logic equipment and software components in addition to audio component 56, the CODEC component E, and IMUX device E'. The base unit F at remote Center D (FIG. 4) includes components at 80, 56, G, G' like in base unit B at the plant 10 (FIG. 2). A suitable audio transceiver 56 for base units B and F is available from Telex Communications Incorporated of Madina, Ohio, and transmits and receives signals from wireless headsets 74, 76, and 78. Typical base unit cameras 13 and 84 may be Power Cam cameras manufactured by PictureTel Corporation. Cameras 13 and 84 of base units B and F can be controlled by infrared (IR) remote control pads 68 and 93, which are also used as a general IR remote control device for the base units (FIGS. 2, 4, and 5). For example, video signal V3 from camera 13 depicting a control area subject 58 can be viewed on a studio-grade monitor 80 at the remote service center D (FIG. 4). Electronically steerable microphones 72 and 82 on the base units B and F provide excellent quality audio reception from subjects 58 and 98. A suitable microphone in the industry is the Power Mic as manufactured by PictureTel Corporation. A video cartridge recording device (VCR) 55 may be included in the base unit (FIG. 7) as standard equipment. The VCR can record what is being monitored for reference and playback later.

In operation, second video signal V2 (and/or V3 or V4) is received by remote base unit F at service center D. The video/audio signals may be selectively received over ISDN line 21 from any plant 10 (FIGS. 2 and 5) or plant 16, 18, 20 (FIG. 3) for evaluation. Focusing and scanning of camera 11 of portable unit C is preferably controlled by an operator at portable unit C. Stationary camera 11a may be controlled by RF remote control signals from remote controller 68 (FIG. 2) or 93 (FIG. 4). The control signals are transmitted from base unit B over zone lines 48 and camera lines 43. Control signals from controller 93 are transmitted to base unit F and then to base unit B over ISDN lines 92, 21.

Figure 1:
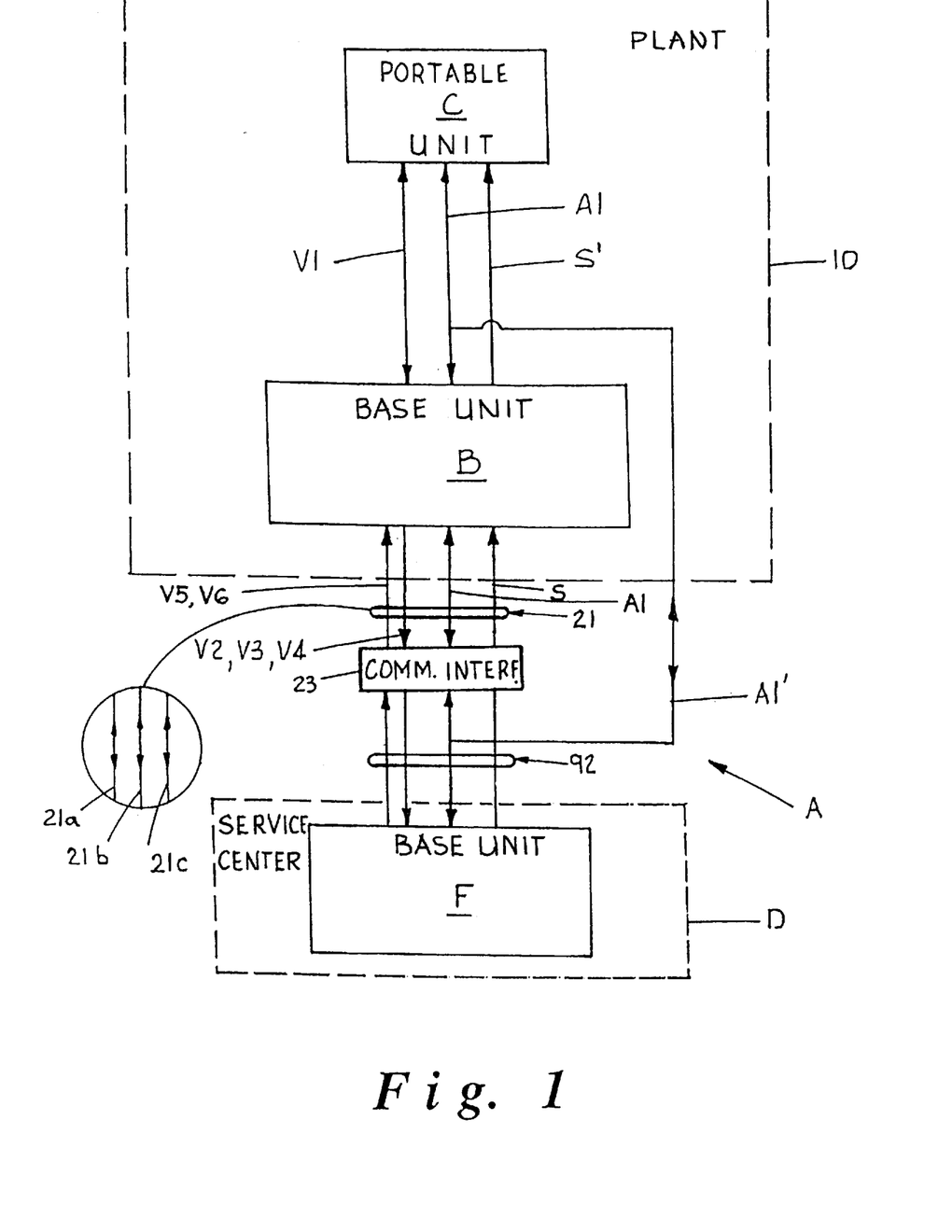
FIG. 1 is a simplified block diagram of a basic system and method for the servicing of in-plant machinery and/or training of machinery operators from a geographically remote service center according to the invention.

Audio signals A1 may be transmitted in both directions between personnel at portable unit C, plant base unit B, and service center base unit F. Service assistance is provided for the machinery within a selected plant by trained technicians based at remote service center D based on audio signal A1 and video signal V2, V3 and/or V4. Audio signal A1 may be transmitted between base unit B and base unit F, or pass directly by audio signals A1' between the service center base unit F and the portable unit C (FIG. 1). Audio signals Al can be transmitted along with the video signals V2–V6 by way of the same ISDN interface 23, or audio signals A1' may be transmitted over separate standard analog telephone sets and lines (FIG. 1).

As previously disclosed, the antenna 70a is provided on base unit B to receive audio signals. The antenna can receive signals directly from operator 74, as illustrated in FIG. 2. The audio signal is transmitted by the other antenna 70b to another control area operator or supervisor 76 at the plant base unit. Wireless headsets are used by the operators and each headset has noise cancellation, adjustable volume control and a lockable transmitter microphone. A suitable headset is available in the industry as manufactured by Telex Communications Inc. of Madina, Ohio. The audio transceiver unit 56 is preferably installed within the base unit B to provide audio communication links. The transceiver unit can also be a part of the zone unit 12 to help improve the quality of the audio signals. Communication of audio messages can also be provided by standard analog phone sets and telephone lines between any two locations in the network of the system.

As can best be seen in FIG. 4, the video service system at service center D includes base unit F with components which are essentially the same as those of base unit B, as described above. However, there may be some differences as necessary to best function as a remote service and/or training center. For example, a service center operator 78 can communicate using a headset and RF signals to the receiving antenna 100a and from the transmitting antenna 100b, or alternately by the preferred hard-wired, audio cable 57 for improved audio quality. Center base unit F receives and processes the video/audio signals via the ISDN network and generates a combined and decompressed video signal, corresponding to video signals V1, V2, V3, and/or V4 for displaying on monitor 80. The combining of signals is by the IMUX device G' and decompression and decoding is by the CODEC component of device G. These same components process video signals from center camera 84 and the zoom camera 94 for transmission to the plant base unit B as video signals V5 and V6 (FIG. 1). Once again, the zoom unit 86 with its zoom camera 94 can observe subject 96 at close range, and the base unit F can generate video signals V5 for transmission to any plant. Remote switch 98 is essentially a standard AB switch which can be used to allow personnel at the service center to select which video signals V2–V4 from available cameras located at the plants are to be processed for viewing at any particular time. The video/audio signals are transmitted between the plant area and the remote service center for full two-way teleconferencing capability between plant personnel and service center personnel.

The pictures observed on the screen of monitors 54 and 80 can be selected from any of the available subjects observed by the various cameras 11, 11a, 13, 84, and 94 in the video service system A. The pictures being observed on monitors 54 and 80 may be controlled by respective plant remote controller 68 or center remote controller 93. Control signals from the remote service center IR remote controller 93 can be received by the base unit F and transmitted to base unit B as control signals S (FIG. 1), as described above. The extent to which control signals S can be used at a plant control area depends on what components are hardwired to system device E of the base unit B. For example, the stationery camera 11a may be controlled from the remote service center.

As can best be seen in FIG. 5, an alternate embodiment of a system and method according to the invention includes a base unit B' having a base unit cabinet 50 on wheels 59 for rolling the base unit to any zone or location in the plant. For example, the base unit can be located in a control area adjacent the machine subject 38 in zone Z4 as illustrated. The zone unit 12 is hard wired to the base unit device E using a cable 48. The ISDN lines 21 from the communications interface 23 connect with the plant 10 at a line splitter device 67 which can select the zone plug which the base unit is plugged into for transmission to the service center. The splitter device may be a manual switch or an automatic switch to automatically connect the lines from the splitter device into which the the base unit is plugged. The automatic switch may be any suitable device for automatically sensing the zone plug to be in the circuit for proper routing; such as relays and phone jacks which are interconnected with a circuit board for making the proper connection. When the IMUX device E' is connected with a respective zone plug 19, the system is automatically connected with the outside telecommunication network. Zones Z1–Z4 have zone plugs 19a–19d hard wired by cables 48a–48d to the splitter device. The base unit device E is hard wired to a zone plug (19d) by a cable 41 to provide a three-wire ISD network service 41a, 41b, 41c to the base unit system device E. The first video signal V1 may be transmitted by direct RF transmissions from camera 11 at portable unit C to the zone unit 12. The stationary camera 11a at zone 24 is also connected to the base unit device E by a cable 43 connected to zone plug 19d. Along with the base unit camera 13, the machine subject 38 may be observed by three cameras. Each camera can concentrate on a different portion of the machine or process and portable unit camera 11 can be hand carried by a control area operator 76. Components associated with the base unit of this alternate means are generally the same including the remote control pad 68, the zoom unit 60, the audio transceiver 56, the studio grade monitor 54 and the microphone 72. The control area operator 76 can have a headset and perform all the duties associated with the machine subject, the portable unit C and other service and/or teaching needs as instructed. The zone plug 19 plugged into by base unit B will be activated.

Figure 6:
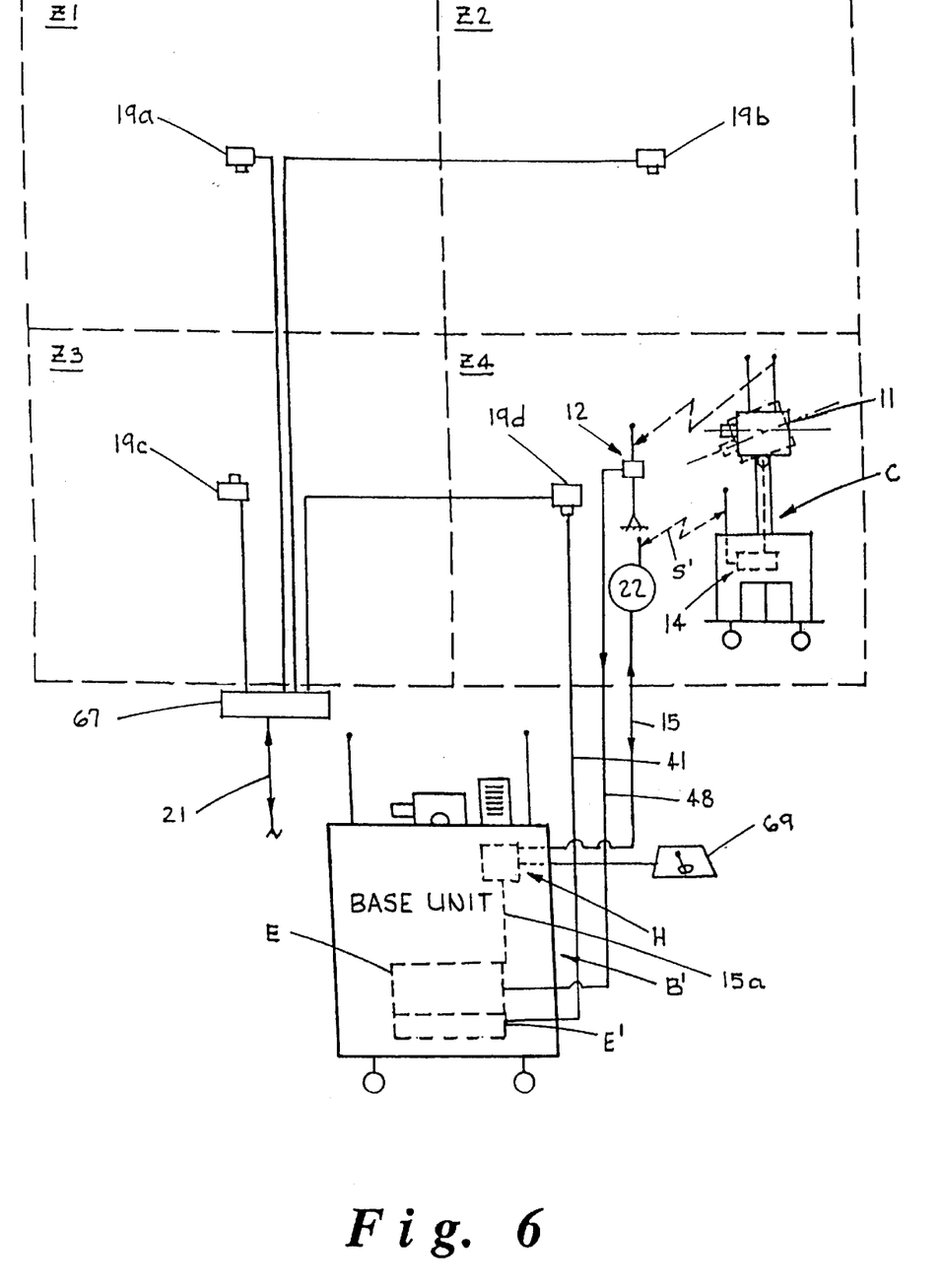
FIG. 6 is a schematic diagram of another embodiment of the system where the scanning and focusing of a video camera located at the machinery can be remotely controlled from a base unit location.

In another embodiment, a method and system for remote wireless control of portable unit C is illustrated in FIG. 6, using radio frequency (RF) transmissions. A camera control transceiver unit H may be added to plant base unit B for transmitting and receiving RF control signal S' to and from a camera control unit 14 at the portable unit C. A hand held remote device 69 can be used to generate RF control signals for the camera 11. The control signals can be transmitted and received by the control unit 14 by RF transmissions to and from the antenna unit 22. A cable 15 connects the antenna unit to the control transceiver unit H. The camera 11 is remotely controlled to tilt-pan-zoom and display components of the machinery for servicing and/or training without the use of an operator at the machine. Preferably, portable cameras 11 can also be remotely controlled from service center D for this remote wireless embodiment of the invention. For this purpose, an additional cable 15a is provided between system device E and the transceiver unit H. This allows a portable camera 11 to be remotely controlled from the remote service center.

The embodiments illustrated in FIGS. 5 and 6 are useful in plants where video signals are not obstructed and in plants of a small size. A further embodiment may be realized by not having a portable unit C and base unit B can be located adjacent the machine subject 38, such as in FIG. 5. Video signals from camera 13 to base unit system device E are hardwire transmitted within the base unit and camera control signals are realized by the use of the IR remote control pad 68. For example, this embodiment is useful in plants where adequate floor space exists in the area of the plant machine subject 38 so that the base unit B with camera 13 can remain in one location to pan-tilt-zoom for adequate viewing of the machine and/or process at the remote service center.

An alternate telecommunications network for use with the system of this invention is the special "T-1" circuit from communication carriers. The T-1 circuit provides 24 channels of data. The use of T-1 circuits is within the scope of this invention when using six T-1 lines for the system of this invention for giving the bandwidth needed. Using an enhanced bandwidth for providing a higher quality video signal, a primary rate interface (PRI) of the ISDN network can also be used to provide 23 channels giving a data rate of 1,544 Kilobits per second.

While a preferred embodiment of the invention has been described using specific terms, such description is for illustrative purposes only, and it is to be understood that changes and variations may be made without departing from the spirit or scope of the following claims.

What is claimed is:

1. A method for servicing production and manufacturing machinery at a plant from a geographically remote service center employing trained service personnel comprising:

viewing said machinery in said plant with a wireless portable video camera including a radio frequency transmitter for transmitting a video signal, and moving said portable video camera to a desired area of said machinery which needs servicing for generating said video signal containing an image of said machinery;

providing a base unit at said plant;

transmitting said video signal from said portable video camera to said base unit using, at least in part, said radio frequency transmitter;

transmitting an audio only signal to said base unit using a wireless, portable audio two-way component carried by plant personnel at said machinery in said plant to generate said audio only signal;

transmitting and receiving said audio only signals using a radio frequency transmission system and a transceiver having an associated transmitting antenna and a receiving antenna hard-wired to said transceiver wherein said transceiver is operatively associated with said base unit;

processing said video and audio only signals at said base unit for transmission over a telecommunication system;

processing said video and audio only signals by converting and compressing said video and audio only signals to provide compressed digital signals for transmission of high quality synchronized video and audio signals to said remote service center;

displaying said video signal on a monitor at said remote service center;

transmitting remote audio signals from said remote center to said base unit in said plant, and processing said remote audio signals for retransmission as audio only signals to said audio two-way component carried by said plant personnel at said machinery;

audibly communicating between plant personnel at said plant and said service personnel at said remote service center using said audio signals in real time two-way audio communications; and providing technical assistance by said service personnel at said remote center to said plant personnel for said machinery while viewing said monitor and listening to said audio communications.

2. The method of claim 1 including mounting said portable video camera on a transportable carrier, and moving and focusing said camera on said operating machinery for servicing by using a remote controller.

3. The method of claim 1 including providing a fixed video camera at a viewing area of said machinery in said plant, and controlling the focusing of said video camera using a remote controller at said geographically remote service center so that said service personnel may focus upon an area of said operating machine for said servicing.

4. The method of claim 3 including using said fixed video camera affixed to a stationary mount in an area of said operating machinery which is controlled with respect to pan, tilt, and focus.

5. The method of claim 3 including using said fixed video camera affixed to said base unit which is controlled with respect to pan, tilt, and focus.

6. The method of claim 1 including providing a plurality of machinery zones within said plant, having respective zone units, and transmitting said video signal from said video camera to a selected zone unit, and from said zone unit to said base unit so that a video signal of high strength which provides high resolution is received from said zone unit.

7. The method of claim 6 including switching between said zone units depending upon the strength of said video signal to provide reception of said video signal of high strength at said base unit.

8. The method of claim 7 including using an automatic switch which automatically senses the strongest signal at one of zone units and transmits said video signal of maximum strength from said zone unit to said base unit.

9. The method of claim 6 including transmitting said video signal from said portable video camera to said zone units using radio frequency (RF) transmission.

10. The method of claim 9 including hard wiring said zone unit to said base unit.

11. The method of claim 1 including displaying said video signal using a high-resolution, studio-grade monitor.

12. The method of claim 11 including providing a base unit video camera at said base unit for providing a base unit video signal which may be transmitted over said telecommunication system to said remote service center, and providing a base unit video monitor for displaying said video signals simultaneously with said service center.

13. The method of claim 1 including providing a zoom unit at said plant having a zoom video camera for zooming in on details of machine parts and components for providing a zoom video signal of said details for transmission to said remote service center.

14. The method of claim 1 including separating said video signal into a plurality of bandwidths of digital signals and strapping said bandwidths together for transmission of said first video signal to said remote service center.

15. The method of claim 14 including strapping together three integrated services digital network lines of said telecommunication system, and using an inverse multiplexor device to obtain a bandwidth sufficient for transmitting said digital signals at a high data rate of at least 384 kilobits per second to provide a high resolution display.

16. A video response system for communicating the operation or servicing of production and manufacturing machinery between a plant where the machinery is located and a remote center comprising:

a wireless, portable video camera for providing a video signal containing an image depicting at least a portion of said machinery in said plant and a radio frequency transmitter associated with said video camera for transmitting said video signal;

a video receiving antenna disposed in a receiving area of said machinery and portable video camera for receiving said video signal;

a two-way audio only communication system for the wireless transmission and reception of audio only signals by attending plant personnel at said machinery;

at least a first base unit located in said plant for receiving said video and audio only signals:

said audio communication system including a two-way wireless, portable audio component carried by said plant personnel, and an audio transceiver associated with said base unit, said audio transceiver including a two-way antenna system having a receiving antenna for receiving audio only signals from said audio component carried by said plant personnel and a transmitting antenna for transmitting audio only signals from said base unit to said audio component carried by said plant personnel;

said audio transceiver being operatively associated with said base unit; and wherein said base unit comprises;

a signal processor for receiving said video and audio only signals to convert said signals into compressed digital signals for high quality synchronized transmission of said video and audio signals to said remote center; and an output interface for delivering said compressed video and audio digital signals in a form for delivery over a telecommunication system a remote audio system at said remote center for receiving said audio signals and for transmitting remote audio signals to said base unit for retransmission as audio only signals to said audio component carried by said plant personnel;

so that real-time wireless video and two-way audio signals are provided for effective operation or servicing of the machinery—for retransmission from said base unit to said remote center.

17. The system of claim 16 wherein said audio communication system includes a receiving antenna and a transmitting antenna wired to said audio transceiver of said base unit for receiving and transmitting radio frequency (RF) audio signals.

18. The system of claim 17 wherein said audio system includes at least one wireless audio headset to be worn by said plant personnel for communicating with said transmitting and receiving antennas.

19. The system of claim 16 wherein said base unit includes a base unit camera for viewing personnel at the location of said base units and generating a base video signal, and a monitor for displaying said camera video signal or said base video signals.

20. The system of claim 16 wherein said base unit includes a microphone for receiving audio messages at the location of the base unit.

21. The system of claim 16 wherein said output interface includes an inverse multiplexor for strapping together a plurality of lines of an integrated services digital network to transmit said digital signals to a second base unit at said service center at a high data rate for generating a high resolution video display at said service center.

22. The system of claim 16 including a second base unit at said remote service center comprising:
- a video monitor for displaying said video signal from said first base unit;
- an audio transceiver for receiving said audio signal from said first base unit, and producing an audible message at said service center; and
- a signal processor for receiving said video signal from said first base unit, and processing said video signal for display on said monitor.

23. The system of claim 22 wherein said video monitor includes a high resolution monitor of studio-grade quality.

24. The system of claim 16 including at least one zone interface unit disposed within an area of said operating machinery for receiving said video signal from said wireless, portable video camera and transmitting said video signal to said first base unit.

25. The system of claim 24 including a radio frequency (RF) transmitter associated with said portable camera for transmitting said video signal to said zone interface unit.

26. The system of claim 24 including a plurality of said zone interface units associated with different zones of operating machinery, and including a switch for selecting a particular zone interface unit to provide a video signal of high quality with regard to the location of said portable video unit.

27. The system of claim 16 including a plurality of said zone interface units associated with different zones of operating machinery, and including a switch for selecting a particular zone interface unit to provide a video signal of high quality with regard to the location of said portable video unit.

28. The system of claim 27 wherein said first base unit is portable and may be moved to one of said zones as desired; and including a base unit cable for plugging said base unit into a zone interface unit, and said zone interface unit being wired to a telecommunication system for transmitting said video and audio signals to said service center.

29. The system of claim 28 including a line splitter device wired between said zone interface units and said telecommunication system, said spliter device having a switch to transmit signals from said zone interface unit into which said base unit is plugged.

30. The system of claim 16 including an integrated services digital network having a plurality of lines strapped together for transmitting said digital signals.

31. The system of claim 16 wherein said first base unit comprises a microphone for receiving audible messages from personnel at said plant for conversion into said audio signals by said audio transceiver.

32. The system of claim 16 including at least one wireless headset to be worn by a plant attendant for communicating with said audio system of said base unit.

33. The apparatus of the system of claim 16 wherein said first base unit comprises a video camera affixed to said base unit which is controllable in a pan, tilt, and focus operation.

34. The system of claim 16 wherein said wireless, portable video camera transmits a one-way video signal to said base unit via said video receiving antenna for retransmission to said remote center.

35. The system of claim 34 wherein said receiving antenna is hardwired to said base unit.

36. The system of claim 35 including a plurality of zone units disposed in different areas of said plant where machinery is located, each said zone unit having one of said video receiving antennas for receiving said one-way video signal when said portable video camera is in a selected zone wherein each said video antenna is hardwired to said base unit.

37. The system of claim 35 wherein said base unit includes a monitor for displaying said one-way video signal, and for displaying other video signals transmitted from said remote center to said base unit.

* * * * *